United States Patent [19]

Vincent et al.

[11] Patent Number: 5,790,741
[45] Date of Patent: Aug. 4, 1998

[54] OPTICAL FIBER SPLICE TRAY

[75] Inventors: Alain Vincent, Juilly; Michel Milanowski, Anserville; Alain Lepeuve, Noisy Le Roi, all of France

[73] Assignee: Alcatel Cable Interface, Vrigne Aux Bois, France

[21] Appl. No.: 651,441

[22] Filed: May 22, 1996

[30] Foreign Application Priority Data

May 24, 1995 [FR] France ........................ 95 06223

[51] Int. Cl.⁶ .................................... G02B 6/36
[52] U.S. Cl. ..................................... 385/135
[58] Field of Search .......................... 385/134–137

[56] References Cited

U.S. PATENT DOCUMENTS

| | | | |
|---|---|---|---|
| 4,428,645 | 1/1984 | Korbelak et al. | 385/135 |
| 4,805,979 | 2/1989 | Bossard et al. | 385/135 |
| 4,840,449 | 6/1989 | Ghandeharizadeh | 385/135 |
| 4,958,903 | 9/1990 | Cobb et al. | 385/135 |
| 5,115,489 | 5/1992 | Norris | 385/135 |
| 5,210,812 | 5/1993 | Nilsson et al. | 385/100 |
| 5,363,467 | 11/1994 | Keith | 385/135 |
| 5,383,051 | 1/1995 | Delrosso et al. | 385/135 X |

FOREIGN PATENT DOCUMENTS

| | | |
|---|---|---|
| 0116480A1 | 8/1984 | European Pat. Off. . |
| 0202994A1 | 11/1986 | European Pat. Off. . |
| 0637767A2 | 2/1995 | European Pat. Off. . |
| 2559277 | 8/1985 | France . |
| WO8908276 | 9/1989 | WIPO . |

*Primary Examiner*—John D. Lee
*Attorney, Agent, or Firm*—Sughrue, Mion, Zinn, Macpeak & Seas, PLLC

[57] ABSTRACT

An optical fiber splice tray is in the form of two tray members that assemble together. The tray includes coiling arrangements, butt joint splice fixing arrangements and optical cable receiving arrangements. The coiling arrangements and butt joint splice fixing arrangements are carried by one of the two tray members. The optical cable receiving means are carried by the other tray member. This other tray member further includes branch connection splice fixing arrangements.

8 Claims, 3 Drawing Sheets

# OPTICAL FIBER SPLICE TRAY

BACKGROUND OF THE INVENTION

1. Field of the Invention

The present invention concerns an optical fiber splice tray.

2. Description of the Prior Art

Fiber optic networks for professional and domestic applications have grown considerably and will continue to do so in the future. A fiber optic network is in the form of branching arteries that terminate on the subscriber's premises. End-to-end and fiber-to-fiber joints are made at points on the these arteries between optical cables, branch cables to serve local subscribers, etc. The prior art trays or sleeves used for this are each for a specific function, such as a butt joint or a branch connection, at a point of the network. For example, American patent US-A-5,210,812 describes a fiber optic cable branch connection sleeve and American patent US-A-4,840,449 concerns an optical cable splice tray.

In the future, because of the increasing number of optical networks, network installers will wish to reduce the total number of different types of equipments, trays or sleeves, used at these butt joint, branch connection, etc points of the network, firstly to simplify the work of technicians on the network and secondly to reduce the inventory costs of these supplies.

Against this background, the invention is directed to providing a multifunction optical splice tray.

SUMMARY OF THE INVENTION

The invention consists in an optical fiber splice tray in the form of two tray members adapted to be assembled together to form said tray and comprising coiling members, butt joint splice fixing means and optical cable receiving means, wherein said coiling means and said butt joint splice fixing means are carried by a first of said two tray members which is separate from a second of said two tray members carrying said optical cable receiving means and said second tray member further includes branch connection splice fixing means.

At least some of the coiling means, butt joint splice fixing means and branch splice fixing means are typically removable.

For a branch connection, the branch splice fixing means are disposed longitudinally in said second tray member and parallel to a cable through-channel in said second tray member. The branch splice fixing means are, for example, in the form of at least one block of foam adapted to be placed over the branch splices.

The optical cable receiving means comprise cable access means formed at least in part in said second tray member and cable fixing means carried by said second tray member.

The cable fixing means for fixing cables entering or leaving the tray comprise at least some of the following: fixing means using cable ties, fixing means that anchor the strength member and fixing means that anchor the peripheral armoring.

The first and second tray members are advantageously articulated together by hinge means. For closing it, the tray may comprise clip closure means carried partly by the first tray member and partly by the second tray member.

Other features and advantages of the present invention will emerge more clearly from a reading of the following description given with reference to the corresponding appended drawings.

DETAILED DESCRIPTION OF THE PREFERRED EMBODIMENT

Figure 1:
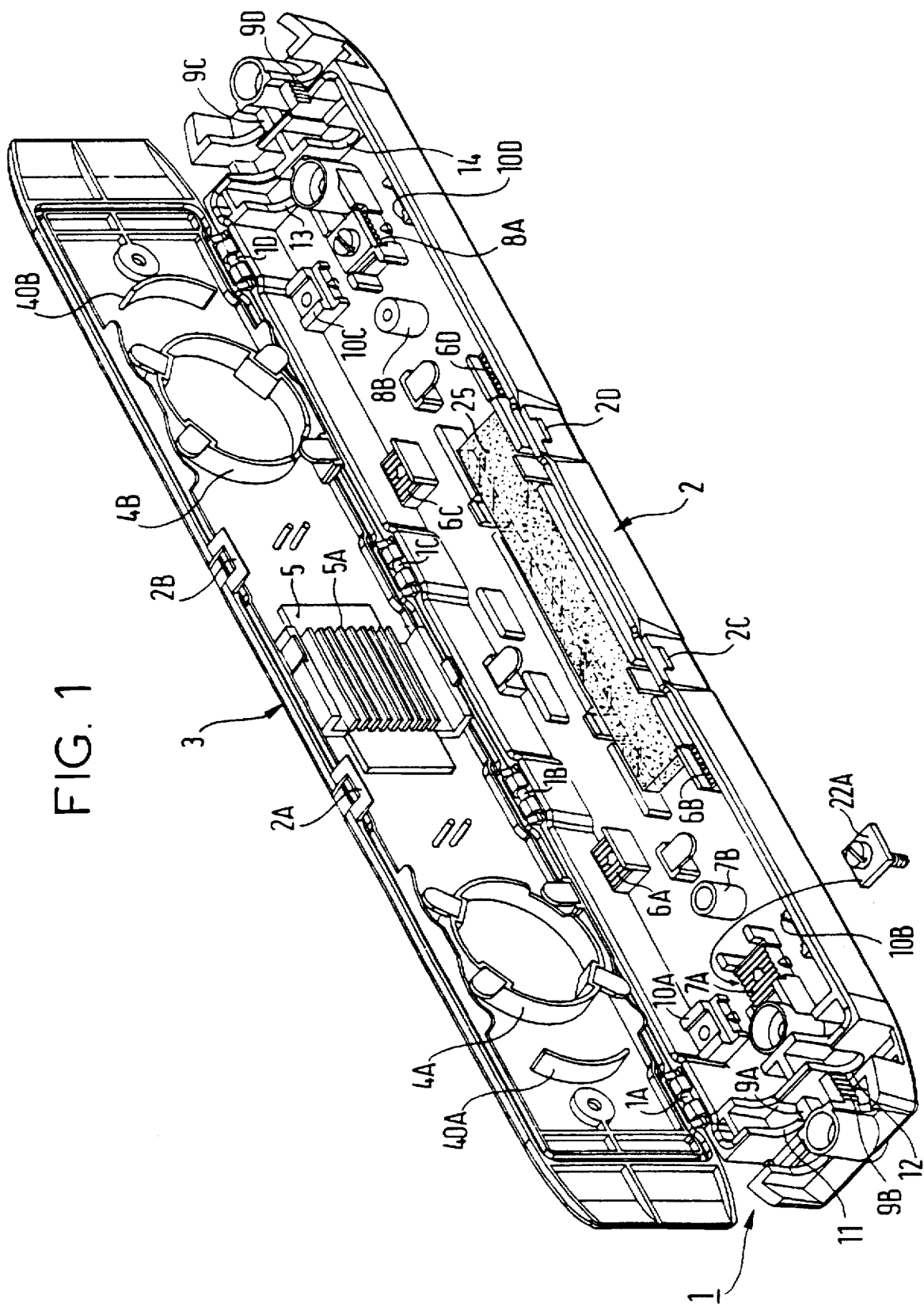
FIG. 1 is a perspective view of a tray of the invention shown open.

Referring to FIG. 1, a multifunction fiber optic splice tray 1 for implementing the invention comprises a lid or first tray member 3 and a body or second tray member 2. The closed tray 1 is substantially rectangular and parallelepipedal in shape. The body 2 has a rectangular bottom delimited by two longitudinal lateral walls and two transverse lateral walls. In the embodiment shown, the lid 3 and the body 2 of the tray 1 are articulated together about a pivot axis defined by hinges 1A, 1B, 1C and 1D carried by an edge of one of the two longitudinal lateral walls of the body 2 and by a corresponding first longitudinal rim of the lid 3, so that the lid can pivot from an open position as shown in FIG. 1 to a closed position. The hinges 1A, 1B, 1C and 1D can be unclipped to separate the lid 3 from the body 2 of the tray to facilitate cable splicing operations carried out by a technician. The tray 1 is held closed by a clip arrangement in the form of at least one tang 2A, 2B carried by a second longitudinal rim of the lid 3, opposite the first rim, and designed to engage in at least one corresponding locking member, 2C, 2D formed in the other of the two longitudinal lateral walls of the body 2. Two screws (not shown) are also provided for closing the tray 1, which is sealed by a circular crosssection seal introduced between the facing edges of the lid 3 and the body 2 of the tray 1. The top of the lid 3 has a rectangular shape corresponding to the rectangular bottom of the body 2 and delimited by shallow rims. At its respective ends are two drums 4A and 4B onto which optical fiber can be coiled. Between the two drums 4A and 4B is a butt joint splice fixing member 5 having parallel blade members 5A defining grooves in which the splices are held. An abutment member 40A, 40B is advantageously provided at the periphery of each drum 4A, 4B to limit displacement of the optical fibers around the drum concerned beyond a predetermined area.

The body 2 of the tray 1 includes optical cable receiving means consisting of optical cable access means which are formed at least in part in this body and optical cable fixing means carried by this body 2. The cable access means are in the form of openings 11, 12 and 13, 14 formed in the two transverse lateral walls of the tray body 2. In the embodiment shown, there are two openings in each of the two transverse walls, on opposite sides of a mid-point. The cable fixing means are of various forms. They include cable tie fixing members 9A, 9B, 9C, 9D, fixing members 7A, 7B and 8A, 8B that anchor the peripheral armoring of the cable, fixing members 6A, 6B, 6C and 6D that anchor the central strength member of the cable, and comb type fixing members 10A, 10B, 10C and 10D. Each of the cable tie type fixing members 9A, 9B, 9C, 9D is in the form of a branch projecting at right angles from the exterior surface of the transverse wall in question of the body and having a generally flat sawtooth surface onto which the outer jacket of the cable is pressed by a cable tie 20A, 20B, 30A, 40A, 50A (see FIGS. 2 and 3) around said branch and the cable, to prevent movement of the incoming or outgoing cable relative to the tray 1. The optical cables fixed by the fixing members 7A, 7B and 8A, 8B that anchor the peripheral armoring of the cable and/or the fixing members 6A, 6B, 6C and 6D that anchor the central strength member of the cable comprise a central strength member around which the optical fibers are coiled, typically in a helical arrangement, the fibers being in turn covered by a peripheral armoring in the form of filaments, a plastics material tubular external jacket surrounding all these components. The fixing members 7A, 7B and 8A, 8B that anchor the peripheral armoring are positioned at respective ends of the tray on the bottom of the body 2. At each of these two ends the fixing member that anchors the peripheral armoring comprises a fixed bearing point 7B, 8B projecting from the bottom of the body and an upstand 7A, 8A with a saw tooth-shape projecting surface. These fixing members that anchor the peripheral armoring are used in the following manner (see FIG. 2). A cable 20 inserted through one of the openings in the transverse wall of the body 2, for example the opening 11, has at least part of its tubular outer jacket removed in order to extract a portion of the peripheral armoring in the form of a wick 22. The wick 22 bears on, and surrounds, the bearing point 7B and one end of the wick 22 is clamped between the saw tooth-shape surface of the upstand 7A and a clamping plate 22A fixed by a screw in a screwthreaded hole formed in the upstand 7A. As shown in FIG. 3, fixing members 6A, 6B, 6C and 6D that anchor the central strength member of the cable are each in the form of an upstand with a saw tooth-shape projecting surface on which the previously extracted strength member 41 of the cable is fixed by screwing on a clamping plate 41A. The comb type fixing members are used only for fixing single-fiber subscriber termination cables. Each comprises an attached member (not shown) having cable insertion grooves and an upstand 10A, 10B, 10C and 10D for screwing on a clamping plate. The upstands 10A, 10B, 10C and 10D project transversely in pairs from both sides of each of the two upstands 7A and 8A which anchor the peripheral armoring. Each of the attached members is held by shoulders on the two facing surfaces of the upstands 10A, 10B, 10C and 10D and the upstands 7A and 8A. Referring again to FIG. 2, there is also on the bottom of the tray body 2 a branch splice fixing support 25, 26 for a branch connection disposed longitudinally in the body 2 relative to a cable throughchannel. This branch splice fixing support further comprises a block of foam 26 adapted to be placed over branch splices 27, 28 and 29. In accordance with the main feature of the invention, which emerges from reading the above description, the coiling drums 4A, 4B and the joint splice fixing member 5 are carried by the lid 3, the optical cable receiving means are contained in the tray body 2 and the body further includes branch splice fixing means 25 and 26.

Applications of the tray of the invention will now be described in more detail with reference to FIGS. 2 and 3, relating to a branch connection joint and a butt joint, respectively.

Figure 2:
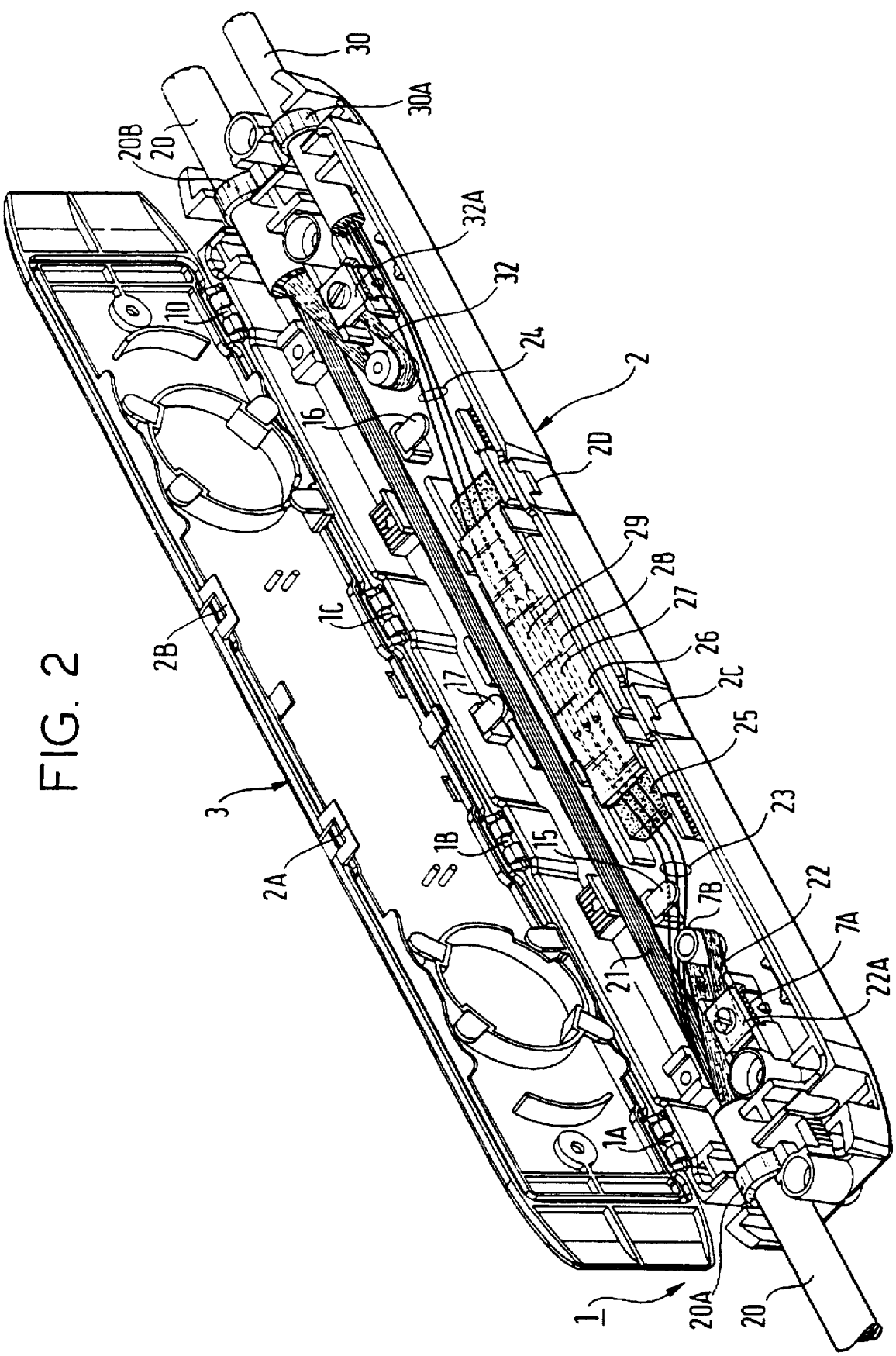
FIG. 2 is a perspective view of a tray of the invention in an optical cable branch connection.
Figure 3:
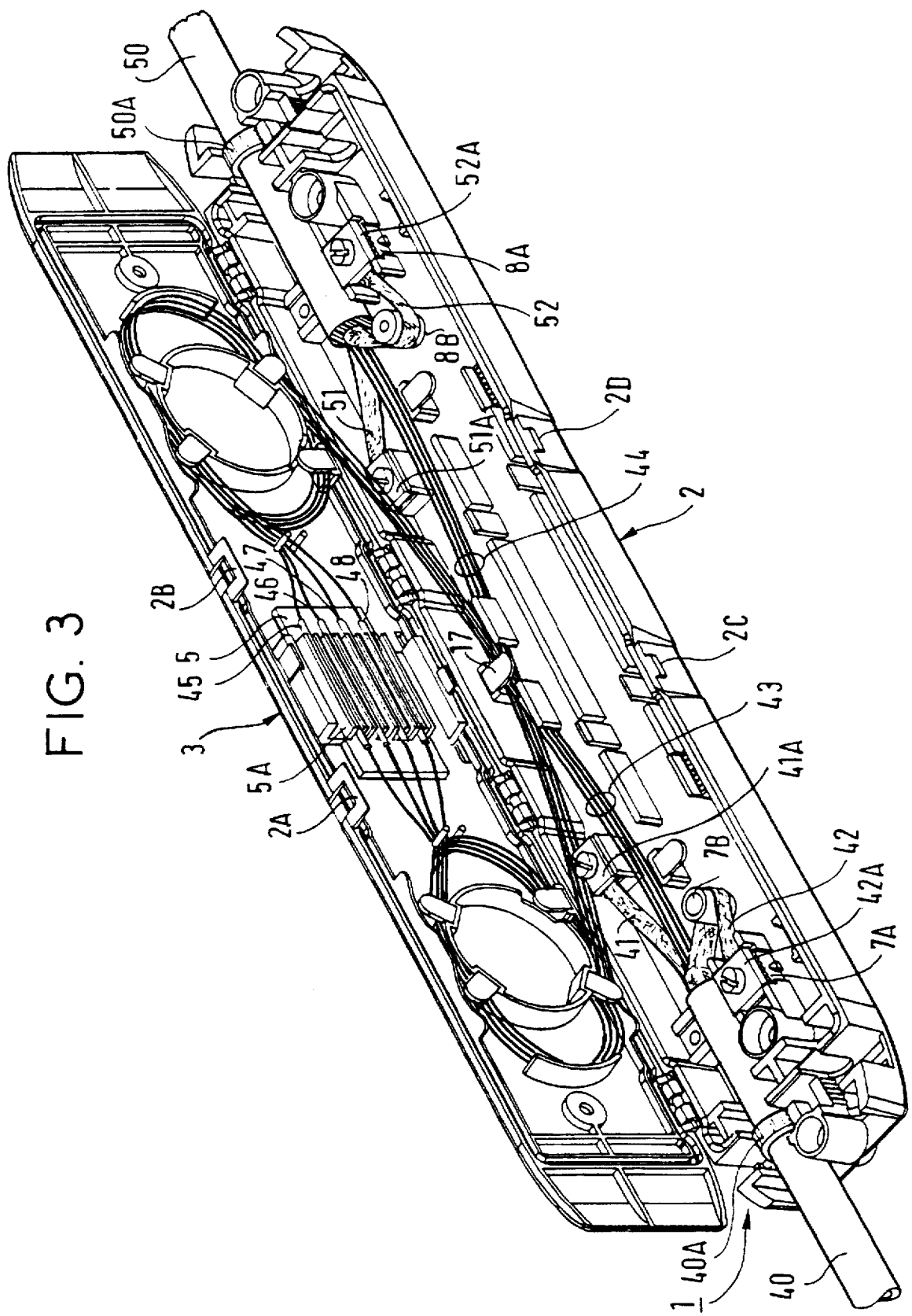
FIG. 3 is a perspective view of a tray of the invention in an optical cable butt joint.

The branch connection joint shown in FIG. 2 is used to provide local service to a given subscriber or subscriber group at a given point on the optical network. As shown in this figure, this joint is between a main cable 20 and a branch cable 30. In FIG. 2 the branch cable is fixed to the tray 1 by means of a ring 30A only. As an alternative to this, or in addition to it, fixing by anchoring a strength member of the cable 30 and/or fixing by anchoring the peripheral armoring of the cable may be used, however. The main cable 20 passes longitudinally through the tray by means of facing entry and exit openings 11 and 13 while the secondary cable 30 passes through the opening 14 in the transverse wall opposite that containing the opening through which the main cable 20 enters. The tubular external jacket and the peripheral armoring are stripped from the main cable over substantially all of the length of the tray. Two wicks 22 and 32 of the peripheral armoring at respective ends of the tray are retained for fixing the cable by anchoring the peripheral armoring, as previously explained. N=3 optical fibers 23 required for the branch connection are extracted from the cable 20 stripped of its tubular jacket and its peripheral armoring, after cutting to an appropriate length, and fed into a branch channel parallel to the through-channel for the main cable, from which they are separated by a partition. The cable 20 which has had its exterior jacket, its peripheral armoring and N=3 optical fibers 23 removed passes through the tray 1, this portion of the cable carrying the reference number 21 in FIG. 2. In practise at least one partition member 15, 16 must be used to separate the through-channel for the cable 20 from the branch splice fixing member 25–26. Splices 27, 28 and 29 are then made between the branch fibers 23 and respective corresponding fibers 24 of the secondary cable 30. These splices are then covered and retained by the block of foam 26.

The butt joint shown in FIG. 3 is used to splice two optical fiber cables 40 and 50 fiber by fiber. Inside the tray 1, the tubular outer jacket and the peripheral armoring are stripped from the end of each of the two cables 40 and 50, to expose a respective plurality of unrestricted optical fibers 43, 44, for each of which there is a surplus length. At the end of each of the two cables a respective peripheral armoring wick 42, 52 and a respective portion of the strength member 41, 51 are fixed by anchoring them as previously explained. Inside the tray 1, the respective surplus lengths of unrestricted optical fibers 43, 44 from each of the two cables 40 and 50 extend from a respective end of the tray 1 over a portion of the length of the tray 1 and are then wound around the coiling drum 4B, 4A at its opposite end. Splices 45, 46, 47 and 48 are then made between the ends of the respective pluralities of optical fibers 43, 44 from the two drums 4A, 4B. The splices are held in the grooves formed by the blade members 5A carried by the butt joint splice fixing member 5. To prevent the portions of the optical fibers 43, 44 between one end of the tray and the drum 4A, 4B at the opposite end moving around inside the tray, which could damage the fibers, an optical fiber routing member 17 is provided to restrict the movement of the fibers to longitudinal displacement within the tray body and to prevent any transverse movement of the fibers. This routing member 17 is disposed near the longitudinal wall of the body 2 to the edge of which the lid 3 is articulated, substantially halfway along it.

Note that in the tray described above at least some of the members carried by the tray 1, such as the coiling drums 4A, 4B, the butt joint splice fixing member 5 or the branch connection splice fixing member 25, can be removable. Alternatively they can be molded in one piece with the tray.

There is claimed:

1. A multifunction optical fiber splice tray for connecting two cables in series or for connecting some fibers from one cable passing through said splice tray with a branch cable, said splice tray comprising:

separate tray members adapted to be assembled together to form said splice tray and comprising a coiling member, a butt joint splice fixing device, an optical cable receiving device and a branch connection splice fixing device, wherein said coiling member and said butt joint splice fixing device are disposed on a first one of said tray members for connecting two cables in series, and said optical cable receiving device and said branch connection splice fixing device are disposed on a second one of said tray members for connecting some fibers from one cable passing through said splice tray with a branch cable.

2. A multifunction optical fiber splice tray according to claim 1, wherein at least one of said coiling member, said butt joint splice fixing device and said branch connection splice fixing device is removably supported in said splice tray.

3. A multifunction optical fiber splice tray according to claim 1, wherein said second tray member comprises a cable through-channel, and wherein said branch connection splice fixing device extends along a longitudinal axis of said second tray member parallel to said cable through-channel.

4. A multifunction optical fiber splice tray according to claim 1, wherein said branch connection splice fixing device comprises at least a block of foam.

5. A multifunction optical fiber splice tray according to claim 1 wherein said optical cable receiving device comprises a cable access formed at least in part in said second tray member and a cable fixing device carried by said second tray member.

6. A multifunction optical fiber splice tray according to claim 5, wherein said cable fixing device comprises at least one of a cable tie fixing member, a fixing member for anchoring a strength member and a fixing member for anchoring a peripheral armoring.

7. A multifunction optical fiber splice tray according to claim 1, wherein said tray members are connected to each other by a hinge.

8. A multifunction optical fiber splice tray according to claim 1, further comprising a clip closure carried partly by said first one of said tray members and partly by said second one of said tray members.

* * * * *